(12) United States Patent  
Adams

(10) Patent No.: US 7,342,195 B2  
(45) Date of Patent: Mar. 11, 2008

(54) CUSTOMIZABLE ION FUSION FORMATION SYSTEM AND PROCESS

(75) Inventor: Robbie J. Adams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/494,361

(22) Filed: Jul. 26, 2006

(65) Prior Publication Data

US 2008/0023450 A1 Jan. 31, 2008

(51) Int. Cl.
*B23K 10/00* (2006.01)

(52) U.S. Cl. .......................... 219/121.46; 219/121.48; 219/121.59; 219/121.47; 219/76.16

(58) Field of Classification Search ........... 219/121.59, 219/121.47, 76.15, 76.16, 121.54, 121.57, 219/75, 121.36

See application file for complete search history.

(56) References Cited

U.S. PATENT DOCUMENTS

| | | | |
|---|---|---|---|
| 4,237,361 A * | 12/1980 | Zwintscher et al. ....... 219/76.1 |
| 4,609,312 A | 9/1986 | Sverdlin | |
| 4,983,807 A * | 1/1991 | Yamada et al. ........ 219/121.48 |
| 5,197,191 A | 3/1993 | Dunkman et al. | |
| 5,281,062 A | 1/1994 | Dunkman et al. | |
| 5,486,671 A * | 1/1996 | Miyata et al. ........... 219/76.14 |
| 6,010,746 A | 1/2000 | Descoteaux et al. | |
| 6,302,625 B1 | 10/2001 | Carey et al. | |
| 6,341,747 B1 | 1/2002 | Schmidt et al. | |
| 6,436,480 B1 | 8/2002 | Upadhya | |
| 6,532,656 B1 | 3/2003 | Wilkins et al. | |
| 6,605,160 B2 | 8/2003 | Hoskin | |
| 6,742,719 B2 * | 6/2004 | Tudor et al. ................... 239/79 |
| 6,916,502 B2 * | 7/2005 | Moore et al. ............... 427/236 |
| 2004/0043160 A1 | 3/2004 | Fusaro, Jr. et al. | |
| 2004/0214938 A1 | 10/2004 | Ruud et al. | |
| 2004/0238508 A1 | 12/2004 | Rabinovich | |
| 2005/0003097 A1 | 1/2005 | Philip et al. | |

* cited by examiner

*Primary Examiner*—Mark Paschall
(74) *Attorney, Agent, or Firm*—Ingrassia Fisher & Lorenz

(57) ABSTRACT

A customizable ion fusion formation system and method is used to repair a targeted repair region of a workpiece with successive layers of feedstock material. The system includes a moveable positioning platform and a control platform positioned separate and apart from the moveable positioning platform. A positioning arm is mounted to the moveable positioning platform and has a deposition head, including a plasma torch and a feedstock feeder mounted thereto. The deposition head is positioned relative to the targeted repair region by positioning and repositioning the moveable positioning platform, and thus the positioning arm, thereby providing customizable repair. A plurality of control components positioned on the control platform are programmable to control the positioning arm whereby a plurality of customizable control parameters are input into the control components and provide positioning and repositioning of the positioning arm to align the deposition head relative to the predetermined targeted repair region to repair the workpiece in the predetermined targeted region.

20 Claims, 1 Drawing Sheet

CUSTOMIZABLE ION FUSION FORMATION SYSTEM AND PROCESS

TECHNICAL FIELD

The present invention relates to the repair of parts and devices, and more particularly relates to customizable solid free-form repair processes that repair parts and devices by selectively applying feedstock material to a substrate.

BACKGROUND

Solid free-form fabrication (SFF) is a designation for a group of processes that produce three dimensional shapes from additive formation steps. SFF does not implement any part-specific tooling. Instead, a three dimensional component is often produced from a graphical representation devised using computer-aided modeling (CAM). This computer representation may be, for example, a layer-by-layer slicing of the component shape into consecutive two dimensional layers, which can then be fed to control equipment to fabricate the part or repair the part. Alternatively, the process may be user controlled instead of computer controlled. Generally speaking, a component may be manufactured or repaired using SFF by successively building feedstock layers representing successive cross-sectional component slices. Although there are numerous SFF systems that use different components and feedstock materials to build or repair a component, SFF systems can be broadly described as having an automated platform/positioner for receiving and supporting the feedstock layers during the process, a feedstock supplying apparatus that directs the feedstock material to a predetermined region to build the feedstock layers, and an energy source directed toward the predetermined region. The energy from the energy source modifies the feedstock in a layer-by-layer fashion in the predetermined region to thereby manufacture or repair the component as the successive layers are built onto each other.

One recent implementation of SFF is generally referred to as ion fusion formation (IFF). With IFF, a torch such as a plasma, gas tungsten arc, plasma arc welding, or other torch with a variable orifice is incorporated in conjunction with a stock feeding mechanism to direct molten feedstock to a targeted surface such as a base substrate or an in-process structure of previously-deposited feedstock. A component is built using IFF by applying small amounts of molten material only where needed in a plurality of deposition steps, resulting in net-shape or near-net-shape parts without the use of machining, molds, or mandrels. The deposition steps are typically performed in a layer-by-layer fashion wherein slices are taken through a three dimensional electronic model by a computer program. A positioner then directs the molten feedstock across each layer at a prescribed thickness.

There are also several other SFF process that may be used to manufacture or repair a component. Direct metal deposition, layer additive processes, and selective laser sintering are just a few SFF processes. U.S. Pat. No. 6,680,456, discloses a selective laser sintering process that involves selectively depositing a material such as a laser-melted powdered material onto a substrate to form complex, net-shape objects. In operation, a powdered material feeder provides a uniform and continuous flow of a measured amount of powdered material to a delivery system. The delivery system directs the powdered material toward a deposition stage in a converging conical pattern, the apex of which intersects the focal plane produced by a laser in close proximity to the deposition stage. Consequently, a substantial portion of the powdered material melts and is deposited on the deposition stage surface. By causing the deposition stage to move relative to the melt zone, layers of molten powdered material are deposited. Initially, a layer is deposited directly on the deposition stage. Thereafter, subsequent layers are deposited on previous layers until the desired three-dimensional object is formed as a net-shape or near net-shape object. Other suitable SFF techniques include stereolithography processes in which a UV laser is used to selectively cure a liquid plastic resin.

One inherent challenge that presents when using SFF, and more particularly an IFF process, to repair a component is with the positioning system. The positioning system generally serves to position a workpiece, so that operations can be performed on it by adding additional material through a wire or powder feed mechanism, referred to herein as a feedstock feed mechanism, at a deposition point. The positioning system may coordinatingly control all three participants of the workpiece manufacturing process, namely the workpiece, the feedstock feed mechanism, and the plasma welding torch. In this way, three-dimensional articles can be fabricated in a predictable, highly-selectable, and useful manner. Control of the positioning system may be achieved manually, by computer-implemented control software, or the like.

Many times when repairing a component using an SFF process the location of the component to be prepared presents a challenge. In many instances the positioning system becomes too large to bring it to the component to be repaired, such as when the part resides inside the hull of a ship. Similarly, many times the component to be repaired is too large to bring it to the system to be repaired, such as when a large diameter pipe is in need of repair. Hence, there is a need for an IFF process and positioning system that provides customization of the system to enable the system to be positioned relative to the component for repair when it is inaccessible with a typical positioning system.

BRIEF SUMMARY

The present invention provides a customizable ion fusion formation system for repairing a workpiece with successive layers of feedstock material comprising a deposition head, a positioning arm, a moveable positioning platform and a control platform. The deposition head is operable to emit a plasma stream in a plasma path by energizing a flowing gas and to feed feedstock into the plasma path of the plasma torch, the feedstock melting at a deposition point when introduced into the plasma path. The deposition head is mounted to the positioning arm. The positioning arm is mounted to the moveable positioning platform. The control platform is positioned separate and apart from the moveable positioning platform and includes a plurality of control components for controlling the position of the positioning arm and operation of the deposition head. The moveable positioning platform is moveable to position the positioning arm, thereby aligning the deposition head with the workpiece to repair the workpiece by transferring the feedstock from the feedstock feeder in a controlled manner. The feedstock is melted at the deposition point and allowed it to re-solidify on the workpiece or on previously-deposited feedstock material.

The present invention also provides another customizable ion fusion formation system in which, a plasma torch is positioned to emit a plasma stream in a plasma path by energizing a flowing gas. The system further includes a feedstock feeder operable to feed feedstock into the plasma path of the plasma torch, the feedstock melting at a deposition point when introduced into the plasma path. A positioning arm is provided, whereby the plasma torch and the feedstock feeder are mounted to the positioning arm to form a deposition head. The positioning arm is positionable to align the deposition head with the workpiece to repair the workpiece by transferring the feedstock from the feedstock feeder to the workpiece in a controlled manner by melting the feedstock at the deposition point and allowing it to re-solidify on the workpiece or on previously-deposited feedstock material. The positioning arm is mounted to the moveable positioning platform. The system further includes a control platform positioned separate and apart from the moveable positioning platform and including a plurality of control components, whereby a plurality of customizable control parameters are input into the control components and provide positioning and repositioning of the positioning arm and operation of the deposition head.

The present invention also provides a customizable ion fusion formation method including the step of providing a positioning arm mounted to a moveable positioning platform and providing a plurality of control components positioned on a control platform. The positioning arm including a deposition head mounted thereto. The deposition head creates a plasma stream in a plasma path by energizing a flowing gas feeding a feedstock into the plasma path of the plasma torch. The feedstock melts at a deposition point when introduced into the plasma path. The plurality of control components are positioned on a control platform, whereby the moveable positioning platform is positioned separate and apart from the control platform. The control components are programmable to control the positioning arm whereby a plurality of customizable control parameters are input into the control components. During the ion fusion formation method, the moveable positioning platform and the positioning arm are positioned to align the deposition head relative to a predetermined targeted repair region to repair the workpiece in the predetermined targeted region.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
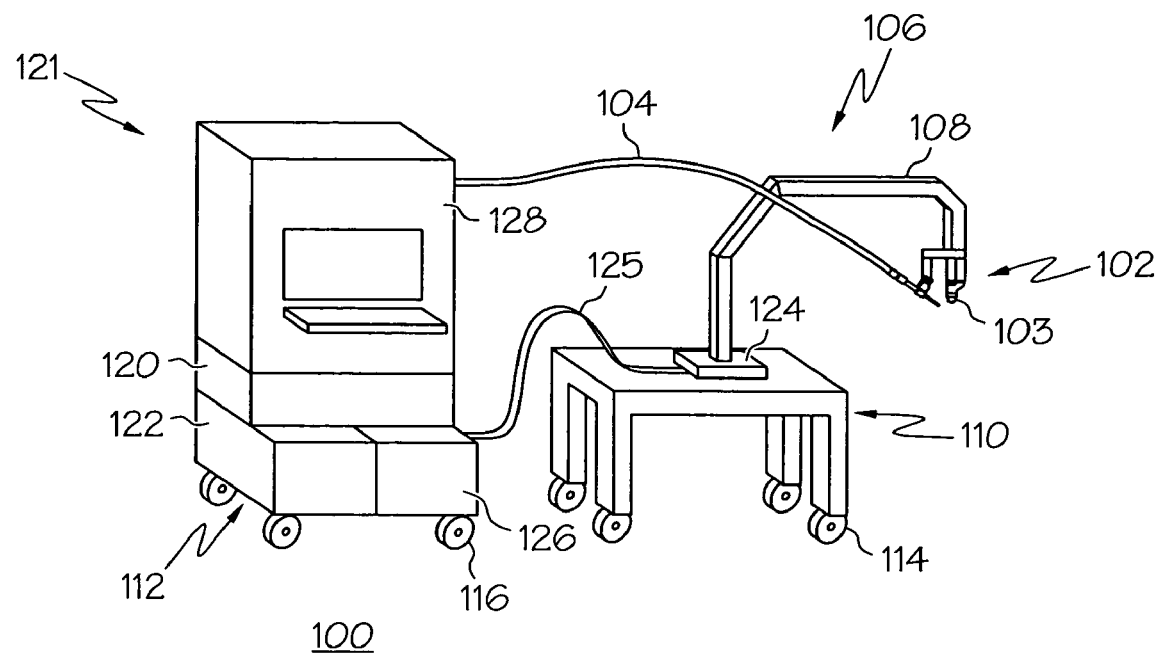
FIG. 1 is a perspective view of a customizable IFF system according to an embodiment of the invention.

FIG. 1 is a perspective view of a customizable IFF system 100, which includes a deposition head 102 including a heating torch 103 that functions in cooperation with a feedstock feed mechanism 104 and a positioning arm 106 to repair a workpiece in a continuous or layer-by-layer manner separate and apart from the main system operating components (described below). The positioning arm 106 may incorporate an extendable component 108 to allow for the positioning of the deposition head 102 into tight spaces not accessible by the positioning arm 106 as a whole and thus allow for novel repairs. More specifically, the positioning arm 106 illustrated in FIG. 1 includes a single extendable component 108 that when extended to a full extension length provides additional reach or extension distance for positioning arm 106, and more particularly deposition head 102. This ability to increase the length of positioning arm 106 allows the deposition head 102 to be positioned within a confined space for repair of a component part housed within the confined space.

The positioning arm 106 during operation continuously positions and repositions the deposition head 102 in a manner whereby feedstock material may be added to it through the feedstock feed mechanism 104 at predetermined deposition points. Further, the positioning arm 106 is configured to coordinate movement and control of the torch 103 and the feedstock feed mechanism 104 to repair a three-dimensional article in a predictable, highly selectable, and useful manner. Control of the positioning arm 106 may be achieved by manual input, automated computer-implemented control software, or the like. The coordinated torch 103 and feedstock feed mechanism 104 provide a highly flexible, manually adaptable, and spontaneously constructible automated customizable system through which components may be repaired without placing the component to be repaired on a positionable platform of an IFF system as in previous systems.

The positioning arm 106 is mounted on a moveable positioning platform 110 that is moveable, separate and apart from a control platform 112. The positioning arm 106 is typically fixably mounted to the moveable positioning platform 110, but may be removeably mounted when required. In this exemplary embodiment, the moveable positioning platform 110 includes a plurality of moveable wheels 114 for positioning and repositioning of the moveable positioning platform 110 proximate the component to be repaired. Similarly, the control platform 112 includes a plurality of moveable wheels 116 for positioning and reposition the control platform 112 near the moveable positioning platform 110. The moveable positioning platform 110 has mounted thereon the positioning arm 106 to provide positioning of the deposition head in close proximity to the component to be repaired by positioning the moveable positioning platform closer to the component to be repaired that would typically be achieved with a larger stationary system.

Additional elements depicted in FIG. 1 include a plurality of control components 121 mounted on the control platform 112, including a gas controller 120 that controls gas and/or fluid flow to the torch 103, which is preferably a plasma welding torch. A plasma or arc power source 122 supplies the necessary power to the torch 103. Positioners and/or positioning motors 124 are supplied with positioning signals via cable 125 from an electric drive 126 that is coupled to a computer 128 or other controlling device. The cable 125 is fabricated of a sufficient length to allow for positioning of the moveable positioning platform 110 separate and apart from the control platform 112 and the control components 121 and in closer proximity to the component to be repaired than has previously been achieved. It should be understood that while gas controller 120, power source 122, electric drive 126 and computer 128 are illustrated as components being housed within a single housing, in an alternate embodiment they may be formed as separate components being housed within separate housings dependent upon space requirements.

In contrast to prior IFF systems, in this particular embodiment deposition head 102 is positionable relative to a part being repaired by the repositioning of the moveable positioning platform 110 and thus positioning arm 106. The deposition head 102 is mounted on the positioning arm 106 that acts in a similar manner as a robotic arm. The deposition head 102 is typically fixably mounted to positioning arm 106, but may be removeably mounted when required. The positioners and/or positioning motors 124 when supplied with positioning signals provide control and movement of positioning arm 106. More specifically, during operation a plurality of customizable control parameters are input into the control components 121 to provide positioning and repositioning of the positioning arm 106. The positioning arm 106 provides positioning of the deposition head 102, including the torch 103 and feedstock feed mechanism 104, in multiple dimensions as needed, for instance along an X, Y, and/or Z axis, including deposition head rotation and tilt, relative to the part being repaired.

Figure 2:
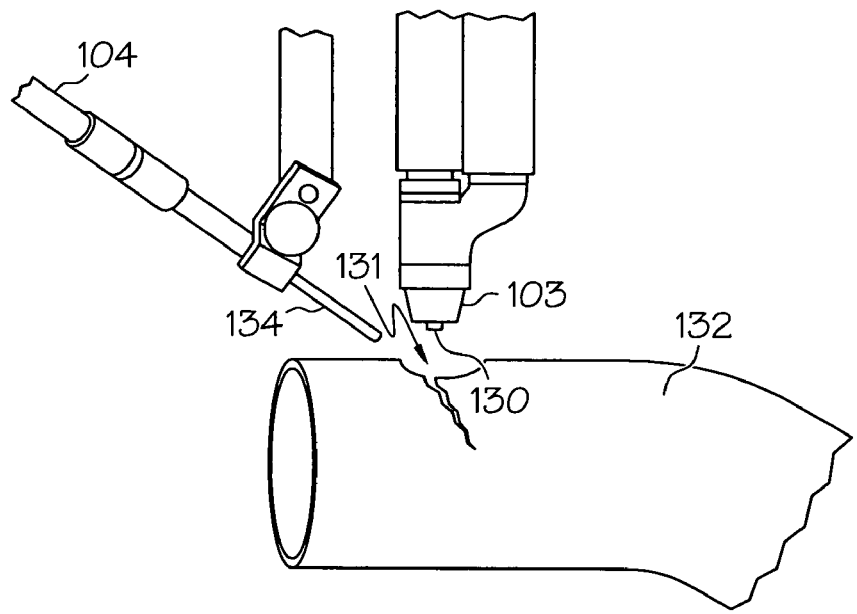
FIG. 2 is closer view of the operating area for the workpiece repair.

A closer view of the operating area for the workpiece repair is further detailed in FIG. 2. The deposition head 102 includes the torch 103 in cooperation with the feedstock feed mechanism 104. During operation, an arc electrode (not shown) is positioned inside a nozzle 130 and inside a gas flow channel of torch 103, and operates to ionize a gas and create a hot argon plasma before the gas exits the nozzle 130. Upon being energized, the argon gas rapidly accelerates from the nozzle 130 toward a targeted repair region 131 of the workpiece 132. The feedstock feed mechanism 104 introduces a feedstock 134 between the torch 103 and the workpiece 132 to be repaired. In an exemplary embodiment, the workpiece 132 is included in an electrical circuit including the ionized gas in order to accelerate and attract the ions from the nozzle 130. The workpiece 132 may be charged by applying a voltage that is opposite of the charge generally present in the ionized plasma gas. The ionized gas is then electrically attracted to the workpiece 132. Use of such electrical charge in the workpiece 132 may also serve to control the direction and distribution of the ionized plasma gas. The degree of attraction between the ions and the workpiece 132 may be controlled by increasing or decreasing the charge present on the workpiece 132.

A noble gas such as argon is preferably ionized using the arc electrode (not shown) positioned near the nozzle 130 of the torch 103, although alternative inert gases, ions, molecules, or atoms, including, but not limited to, $H_2O$, $CO_2$ and $O_2$, may be used in conjunction with the torch 103 instead of argon. These alternative mediators of the plasma energy may include positive and/or negative ions or electrons alone or together with ions. Further, reactive elements may be combined with an inert gas such as argon to optimize performance of the torch 103. The plasma generating process so energizes the argon gas that the gas temperature is raised to between 5,000 and 30,000K. Consequently, only a small volume of energized argon gas is required to melt feedstock 134 from the feedstock feed mechanism 104. Nozzles of varying apertures or other orifices may be used to provide specific geometry and plasma collimation for the repair of different components. Direct beam nozzle orifices may contrast with nozzles having a fan shape or other shapes.

The ionized argon plasma, and all other ionized noble gases, have strong affinity for electrons and will obtain them from the surrounding atmosphere unless the atmosphere consists of gases having equal or higher electron affinity. One advantage of the exemplary customizable IFF system depicted in the drawings does not require a pressurization chamber or other chamber in which the ambient gas is controlled and allows for mobility of the positioning arm 106 and deposition head 102. However, to prevent the ionized argon plasma from obtaining electrons and/or ions from the surrounding atmosphere, i.e. from nitrogen and oxygen typically present in ambient environments, the ionized argon plasma is sheathed or protected by a curtain of helium, another noble gas, or other inert gases flowing from the nozzle 130 from a coaxial channel (not shown). Helium and other noble gases hold their electrons with a high degree of affinity, and are less susceptible than oxygen or nitrogen to having its electrons taken by the ionized argon plasma.

Any material susceptible to melting by an argon ion or other plasma beam may be supplied using a powder feed mechanism or the feedstock feed mechanism 104 as feedstock 132. Such materials may include steel alloys, aluminum alloys, titanium alloys, nickel alloys, although numerous other materials may be used as feedstock depending on the desired material characteristics such as fatigue initiation, crack propagation, post-welding toughness and strength, and corrosion resistance at both welding temperatures and those temperatures at which the repaired component will be used. Specific operating parameters including plasma temperatures, build materials, melt pool parameters, nozzle angles and tip configurations, inert shielding gases, dopants, and nozzle coolants may be tailored to fit an IFF process. U.S. Pat. No. 6,680,456 discloses an IFF system and various operating parameters, and is hereby incorporated herein by reference.

As previously discussed, one inherent challenge when repairing a component or part using an IFF process is accessing the component to be repaired and more particularly, achieving close proximity between the deposition head 102 and the targeted repair region 131 of the workpiece 132 due to size constraints of both the system 100 and the workpiece 132. As illustrated in FIG. 1, the customizable IFF system 100 provides separation between the portion of system 100 that controls the repair process, namely the gas controller 120, the power source 122, the electric drive 126 and the computer 128 and the portion of the system 100 that supplies the actual deposition of the feedstock 134 to repair the workpiece 132. More specifically, the customizable IFF system 100 allows for the positioning and repositioning of the moveable positioning platform 110, and more particularly, the deposition head 102 near or proximate the workpiece 132 to be repaired while the control platform 112, and more particularly, the control components 121 are positioned separate and apart. A control link, such as the cable 125, provides control of the positioning arm 106 and the deposition head 102 via the positioners and/or positioning motors 124. To this effect, software programs are required for the computer 128 to control the deposition rate, heat input and movement of the positioning arm 106, and thus the deposition head 102. In that the customizable IFF system 100 is readily reconfigurable, it can be customized for different applications.

Thus, the customizable IFF system 100 of the present invention includes various mechanisms for improving accessibility between the deposition head 102 and a targeted region 131 of a workpiece 132 to be repaired. The configuration of the system 100 to include the moveable positioning platform 110, the control platform 112, and the mounting of the deposition head 102 on a repositionable positioning arm 106 provides customization of the system 100 and allows for the system 100 to be brought to the workpiece 132 to be repaired. The positioning arm 106 is positionable to align the deposition head 102 with the workpiece 132 to repair the workpiece 132 by transferring the feedstock 134 from the feedstock feeder 104 in a controlled manner by melting the feedstock 132 at a deposition point and allowing it to re-solidify on the workpiece 132 or on previously-deposited feedstock material. It is anticipated that the customizable system may be implemented with only minor modification in some instances to existing IFF systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A customizable ion fusion formation system for three-dimensional repair of a workpiece with successive layers of feedstock material comprising:
    a deposition head operable to emit a plasma stream in a plasma path by energizing a flowing gas and to feed feedstock into the plasma path of the plasma torch, the feedstock melting at a deposition point when introduced into the plasma path;
    a positioning arm, the deposition head mounted to the positioning arm;
    a moveable positioning platform, the positioning arm mounted to the moveable positioning platform; and
    a control platform, the control platform positioned separate and apart from the moveable positioning platform and including a plurality of control components for controlling the position of the positioning arm and operation of the deposition head,
    whereby the moveable positioning platform is moveable to position the positioning arm along an X, Y, and Z axis, thereby aligning the deposition head with the workpiece to repair the workpiece by transferring the feedstock from the feedstock feeder in a controlled manner by melting the feedstock at the deposition point and allowing it to re-solidify on the workpiece or on previously-deposited feedstock material.

2. The system of claim 1, wherein the deposition head is fixably mounted to the positioning arm.

3. The system of claim 1, wherein the deposition head includes a plasma torch positioned to emit the plasma stream in a plasma path and a feedstock feeder operable to feed the feedstock into the plasma path of the plasma torch.

4. The system of claim 1, wherein a plurality of customizable control parameters are input into the control components to provide positioning and repositioning of the positioning arm.

5. The system of claim 4, wherein the plurality of control components include a gas controller, a power source, an electric drive and a computer.

6. The system of claim 4, wherein the plurality of control components are housed within a single housing.

7. The system of claim 4, wherein the plurality of control components are housed separately within a plurality of housings.

8. The system of claim 4, wherein the plurality of customizable control parameters are input into the computer for manual control of the positioning arm.

9. The system of claim 4, wherein the plurality of customizable control parameters are input into the computer for automated control of the positioning arm.

10. A customizable ion fusion formation system for three dimensional repair of a workpiece with successive layers of feedstock material comprising:
    a plasma torch positioned to emit a plasma stream in a plasma path by energizing a flowing gas;
    a feedstock feeder operable to feed feedstock into the plasma path of the plasma torch, the feedstock melting at a deposition point when introduced into the plasma path;
    a positioning arm, the plasma torch and the feedstock feeder mounted to the positioning arm to form a deposition head, whereby the positioning arm is positionable along an X, Y, and Z axis to align the deposition head with the workpiece to repair the workpiece by transferring the feedstock from the feedstock feeder to the workpiece in a controlled manner by melting the feedstock at the deposition point and allowing it to re-solidify on the workpiece or on previously-deposited feedstock material;
    a moveable positioning platform, the positioning arm mounted to the moveable positioning platform; and
    a control platform, the control platform positioned separate and apart from the moveable positioning platform and including a plurality of control components, whereby a plurality of customizable control parameters are input into the control components and provide positioning and repositioning of the positioning arm and operation of the deposition head.

11. The system of claim 10, wherein the deposition head is fixably mounted to the positioning arm.

12. The system of claim 10, wherein the plurality of control components include a gas controller, a power source, an electric drive and a computer.

13. The system of claim 10, wherein the plurality of control components are housed within a single housing.

14. The system of claim 10, wherein the positioning arm further includes at least one extendable component.

15. The system of claim 10, wherein the plurality of customizable control parameters are input into the computer and provide one of manual control or automated control of the positioning arm.

16. A customizable ion fusion formation method for three-dimensional repair of a workpiece with successive layers of feedstock material comprising:
    providing a positioning arm mounted to a moveable positioning platform, the positioning arm having a deposition head mounted thereto, the deposition head creating a plasma stream in a plasma path by energizing a flowing gas feeding a feedstock into the plasma path of the plasma torch, the feedstock melting at a deposition point when introduced into the plasma path;
    providing a plurality of control components positioned on a control platform, whereby the moveable positioning platform is positioned separate and apart from the control platform, the control components programmable to control the positioning arm whereby a plurality of customizable control parameters are input into the control components; and positioning the moveable positioning platform and the positioning arm along an X, Y, and Z axis to align the deposition head relative to a predetermined targeted repair region to repair the workpiece in the predetermined targeted region.

17. The method of claim 16, wherein the deposition head includes a plasma torch positioned to emit the plasma stream in a plasma path and a feedstock feeder operable to feed the feedstock into the plasma path of the plasma torch.

18. The method of claim 16, further including the step of adjusting the rate at which the feedstock material is introduced into the plasma stream to produce an optimal feedstock deposition rate.

19. The method of claim 16, wherein the plurality of control components include a gas controller, a power source, an electric drive and a computer.

20. The method of claim 16, wherein the plurality of customizable control parameters are input into the computer to provide one of manual control or automated control of the positioning arm.

\* \* \* \* \*